United States Patent [19]

Elmore et al.

[11] 4,215,473

[45] Aug. 5, 1980

[54] CUTTING AND ABRADING HAND TOOL

[75] Inventors: James Elmore, Simsbury; Richard E. Ziel, Cheshire, both of Conn.

[73] Assignee: The Stanley Works, New Britain, Conn.

[21] Appl. No.: 972,000

[22] Filed: Dec. 21, 1978

[51] Int. Cl.² ............................................. B23D 71/08
[52] U.S. Cl. .................................... 30/172; 51/205 R; 76/101 SM
[58] Field of Search ......... 30/172; 51/170 TL, 205 R; 76/101 SM; 29/78

[56] References Cited

U.S. PATENT DOCUMENTS

| | | | |
|---|---|---|---|
| 2,546,577 | 3/1951 | Young | 30/172 X |
| 3,120,084 | 2/1964 | Phillips | 51/205 R |
| 3,583,107 | 6/1971 | Benis | 51/170 TL |
| 3,914,837 | 10/1975 | Coon | 76/101 SM |
| 4,028,781 | 6/1977 | Konrad | 76/101 SM |

Primary Examiner—Jimmy C. Peters
Attorney, Agent, or Firm—Prutzman, Kalb, Chilton & Alix

[57] ABSTRACT

A cutting and abrading hand tool is provided with a blade holder of generally rectangular shape and provided on opposite external side walls with parallel longitudinally extending outwardly facing grooves. Interchangeable and disposable blades of tubular form are provided which have various cross-sectional configurations and which have a longitudinally extending slot therein defined by inwardly extending flanges dimensioned to have a slip fit with the grooves of the holder. The holder is provided with abutments at either end of the grooves for securing the blades on the holder. The end portions of the holder having the abutments at one end of the holder are manually flexible inwardly to permit endwise removal and replacement of the blades.

10 Claims, 7 Drawing Figures

U.S. Patent
Aug. 5, 1980
4,215,473
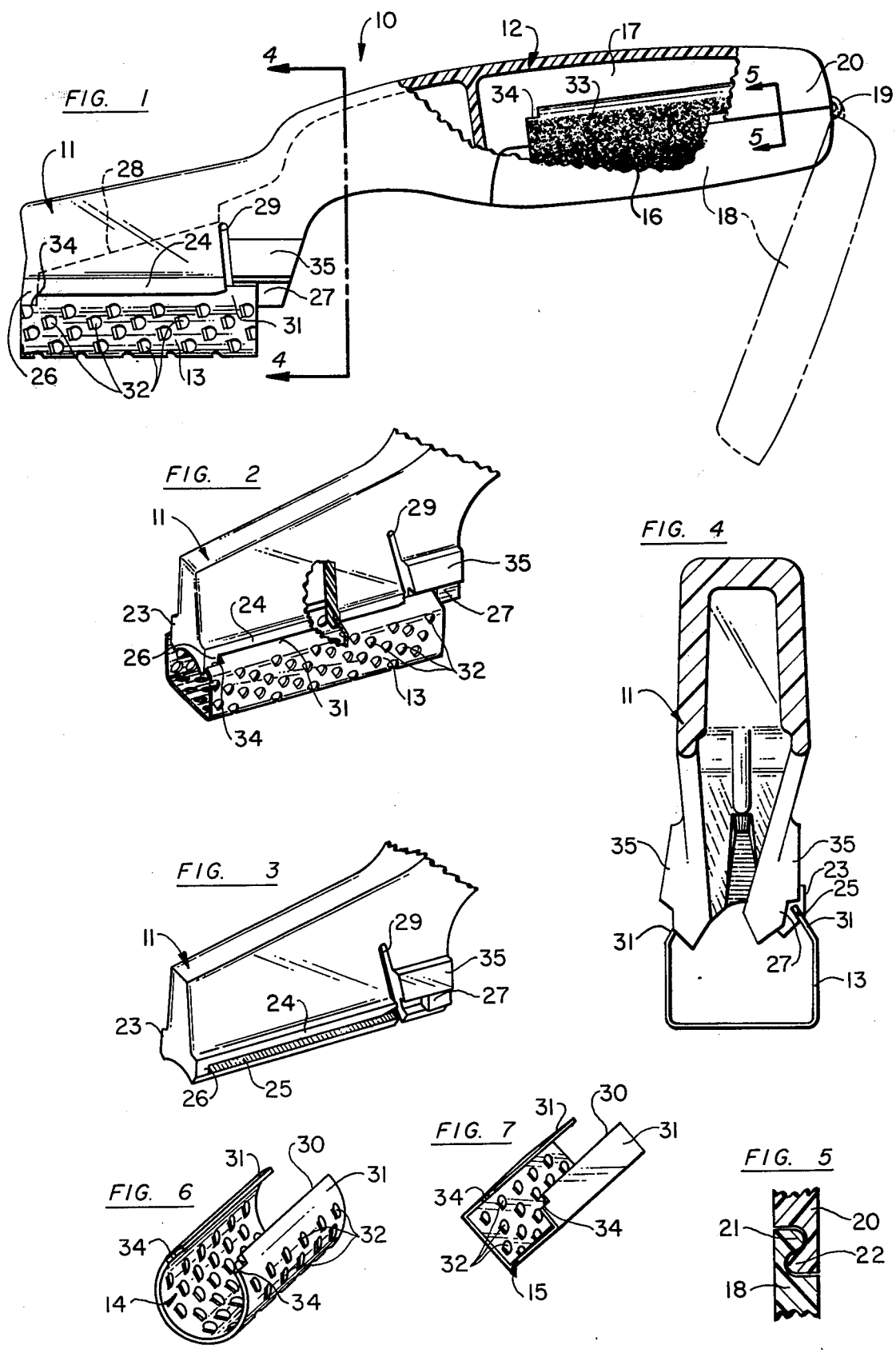

CUTTING AND ABRADING HAND TOOL

BACKGROUND AND SUMMARY OF THE INVENTION

This invention relates to cutting and abrading hand tools of the type which are useful for scraping, finishing, shaping, sculpturing and like operations.

An object of the invention is to provide a hand tool of the type referred to which can be applied selectively to flat surfaces or to surfaces having various contours.

A further object is to provide such a hand tool which can be applied to small areas including confined areas which are not readily accessible.

A principal object is to provide an inexpensive yet rugged hand tool accomplishing the foregoing objects which utilizes interchangeable and disposable blades of varying configurations, which blades are of small size and simple and economical to fabricate and which are easily attached and detached from the holder without the need for tools, and which are securely mounted on the holder when installed.

Other objects will be in part obvious and in part pointed out in more detail in the following description and the accompanying drawings which set forth an illustrative embodiment of the invention.

BRIEF DESCRIPTION OF THE DRAWINGS

In the drawings:

FIG. 1 is a side view, partially in section, of a cutting and abrading hand tool embodying the invention;

FIG. 2 is a fragmentary perspective view of the blade and blade holder portion of the hand tool of FIG. 1;

FIG. 3 is a fragmentary perspective view similar to FIG. 2 with the blade removed;

FIG. 4 is a cross-sectional view taken along the line 4—4 of FIG. 1 with one side flexed inwardly for clarity of illustration;

FIG. 5 is a cross-sectional view taken along the line 5—5 of FIG. 1;

FIG. 6 is a perspective view of an alternate form of blade; and

FIG. 7 is a perspective view of another alternate form of the blade.

DESCRIPTION OF THE PREFERRED EMBODIMENT

Referring to the drawings showing a preferred embodiment of the invention, the tool 10 shown in its entirety in FIG. 1 comprises the forward portion 11 which is the blade holder and a rearwardly extending portion 12 which forms the handle by means of which the tool may be manually manipulated. Mounted on the blade holder 11 as shown in FIGS. 1 and 2 is a replaceable blade 13 of generally rectangular shape. Replaceable blades 14 and 15 shown in FIGS. 6 and 7, respectively, illustrate different forms of the replacement blades and replaceable blade 16 partially shown in the handle storage compartment 17 illustrates a replaceable blade having a different abrasive structure, all of which will be described more fully hereinafter.

The handle storage compartment 17 is provided by the hollow handle 12 which has a releasable lower half 18 hinged to the upper half 20 at 19. In the preferred embodiment, the tool 10 is molded of plastic such as high impact polypropylene, and the hinge 19 may be integrally formed between the two handle halves 18, 20. As shown in FIG. 5, the meeting edges of the handle halves 18, 20 may be formed with complementary interengaging beads 21, 22 whereby the lower half 18 may be latched onto the upper half 20. The material of which the handle is made is sufficiently flexible so that the sides of the lower handle half 18 can be pressed inwardly manually to release the beads when it is desired to open the compartment 17.

The blade holder 11 is preferably formed, as best shown in FIGS. 2 and 3, so that in vertical cross-section it is in the shape of an inverted T having at its base the longitudinally extending shoulders 23, 24. The outer edges of the shoulders are parallel to each other and each is provided with a longitudinal groove 25 extending between the abutments 26, 27 located at opposite ends of the shoulders 23, 24. As indicated by the dotted line 28 in FIG. 1, the blade holder has a downwardly opening cavity increasing in depth from front to back, and the side walls are slotted at 29 just slightly forward of the rear abutments 27.

The replaceable and interchangeable blades 13–16 are all tubular in configuration and characterized by a longitudinal slot 30 bounded by inwardly extending flanges 31. The blades 13–15 are formed of hardened sheet metal having struck out cutting teeth 32. A preferred form of the teeth 32 is that disclosed in prior U.S. Pat. No. 2,708,378 and as formed in blades sold under the trademark "Surform." Blade 16 is also preferably formed of sheet metal, but may be formed of any suitable material. Instead of having cutting teeth, blade 16 is coated with abrasive material 33 such as, for example, tungsten carbide grit which is brazed thereon.

Blade 13 is generally rectangular in cross-section providing flat abrasive or cutting surfaces on both the bottom and sides for use on flat surfaces. Blades 14 and 16 are cylindrical in form for use on grooves and similarly rounded surfaces, while blade 15 is generally triangular for use in correspondingly shaped grooves. Blades having other shapes to conform to other contours may also be provided. All of the working surfaces of the blades are provided with cutting teeth or abrasive grit as shown, but it is important that the flanges 31 have smooth surfaces. Also note that the flanges 31 are notched at one end as indicated at 34 for a purpose to be described later.

As shown in FIGS. 1 and 2, the blades when mounted on the blade holder 11 have their flanges 31 engaged in the grooves 25, the slot 30 being dimensioned so that the flanges have a slip fit with the grooves 25. The length of the flanges 31 is such that the ends abut against the abutments 26, 27. The notches 34 accommodate the forward abutments 26 and permit the front edge of the blade to extend all the way to the front of the holder 11. Since the blades are made of relatively stiff metal, it will be seen that when a blade is seated on the holder as described, it will be securely and firmly held in operating position.

In order to remove or replace a blade, it is only necessary to press inwardly on the sides of the holder 11 rearwardly of the slots 29 causing the end portions to flex inwardly sufficiently to permit the blade to clear the abutments 27 so that the blade can be slid longitudinally to and from seated position. Pads 35 may be provided on the sides of the holder rearwardly of the slots 29 for convenience for grasping between the thumb and forefinger when pressing the sides together to permit insertion or removal of the blade.

In addition to providing clearance for the abutments 26, the notches 34 in the blades also assure that the blades will be mounted on the holder 11 with the cutting teeth 32 facing in the rear direction. In general, it is preferred to form the tool so that it will cut or abrade on the pulling stroke. Another feature of the invention is that because of the shape of the holder 11, the narrow portion above the shoulders 23, 24 is small enough to fit within the slot 30 of a blade and, accordingly, it can be used as a tool for clearing out the chips from a blade when the blade is clogged with them.

As will be apparent to persons skilled in the art, various modifications, adaptations and variations of the foregoing specific disclosure may be made without departing from the teachings of the present invention.

We claim:

1. A cutting or abrading hand tool comprising a blade holder of generally rectangular shape having side walls with parallel outer side surfaces, each having a longitudinal groove therein forming a pair of outwardly and oppositely facing parallel grooves, a replaceable generally tubular blade having a cutting or abrading surface and having a longitudinal slot extending end to end thereof and bounded by inwardly extending parallel flanges dimensioned to engage in and have a slip fit with the outwardly facing parallel grooves of the holder, abutments on the blade holder at opposite ends of the grooves normally engageable by the ends of the blade flanges thereby preventing longitudinal movement of the blade relative to the holder, the abutments at one end of the holder being formed on an inwardly flexible portion of the holder which can be manually flexed inwardly to permit the blade to be mounted on or removed from the blade holder by inserting or withdrawing the blade flanges into or out of the grooves while moving the blade longitudinally of the holder.

2. A hand tool as defined in claim 1 wherein the inwardly flexible portion of the holder is formed by narrow spaced apart end portions of the holder walls which are separated from the remainder of the walls by slits therebetween.

3. A hand tool as defined in claim 1 wherein the blade holder is formed of plastic and the blade is formed of sheet metal having struck-up cutting teeth therein.

4. A hand tool as defined in claim 3 wherein the blade holder is formed with an elongated handle integrally connected to one end thereof.

5. A hand tool as defined in claim 1 wherein the flanges of the blade are notched at one end to accommodate the abutments at the end of the holder opposite from said one end.

6. A hand tool as defined in claim 1 wherein the tubular blade is generally rectangular in cross-section providing a flat bottom wall and flat side walls having a cutting and abrading surface.

7. A hand tool as defined in claim 1 wherein the tubular blade is generally triangular in cross-section forming two angularly related side walls which are provided with a cutting and abrading surface.

8. A hand tool as defined in claim 1 wherein the tubular blade is generally circular in cross-section forming a parti-cylindrical wall having a cutting and abrading surface.

9. A blade for use with a hand tool having a blade holder of generally rectangular shape provided with parallel outwardly facing longitudinal grooves in its opposite side walls terminating at one end at fixed abutments, said blade having a cutting or abrading surface and being of generally tubular form with a longitudinal slot extending end to end thereof, the slot being bounded by inwardly extending longitudinal flanges with parallel inner edges dimensioned to engage in and have a slip fit with the grooves of the holder, said flanges being notched at one corner to accommodate the fixed abutments on the blade holder.

10. A blade as defined in claim 9 wherein the blade is formed of sheet metal and the area between the flanges is formed with struck-up cutting teeth facing in the opposite direction from the end of the blade at which the flanges are notched.

* * * * *